United States Patent
Itoh et al.

(10) Patent No.: US 10,654,975 B2
(45) Date of Patent: May 19, 2020

(54) TIRE

(71) Applicant: BRIDGESTONE CORPORATION, Chuo-ku, Tokyo (JP)

(72) Inventors: Yuki Itoh, Tokyo (JP); Yasunori Tarutani, Tokyo (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 0 days.

(21) Appl. No.: 15/513,989

(22) PCT Filed: Sep. 24, 2015

(86) PCT No.: PCT/JP2015/076980
§ 371 (c)(1),
(2) Date: Mar. 24, 2017

(87) PCT Pub. No.: WO2016/047708
PCT Pub. Date: Mar. 31, 2016

(65) Prior Publication Data
US 2017/0291991 A1    Oct. 12, 2017

(30) Foreign Application Priority Data

Sep. 24, 2014   (JP) ................. 2014-193427

(51) Int. Cl.
| C08G 69/40 | (2006.01) |
| C08G 69/36 | (2006.01) |
| B60C 1/00 | (2006.01) |
| C08G 69/14 | (2006.01) |

(52) U.S. Cl.
CPC ............ *C08G 69/40* (2013.01); *B60C 1/0041* (2013.01); *C08G 69/36* (2013.01); *C08G 69/14* (2013.01); *C08G 2380/00* (2013.01)

(58) Field of Classification Search
None
See application file for complete search history.

(56) References Cited

U.S. PATENT DOCUMENTS

| 4,700,927 A | 10/1987 | Henderson |
| 6,590,065 B1 | 7/2003 | Goldfinger |
| 2013/0059142 A1 | 3/2013 | Chung et al. |
| 2013/0192736 A1 | 8/2013 | Song et al. |
| 2014/0242370 A1 | 8/2014 | Song et al. |
| 2016/0023515 A1 | 1/2016 | Fudemoto et al. |
| 2016/0039973 A1 | 2/2016 | Honjo et al. |
| 2016/0046152 A1 | 2/2016 | Fudemoto et al. |
| 2016/0046764 A1 | 2/2016 | Fudemoto et al. |
| 2017/0210167 A1 | 7/2017 | Itoh |
| 2017/0217251 A1 | 8/2017 | Itoh |
| 2017/0232796 A1 | 8/2017 | Itoh |
| 2017/0320359 A1 | 11/2017 | Kyo et al. |

FOREIGN PATENT DOCUMENTS

| JP | S63-151502 A | 6/1988 |
| JP | 2012-045790 A | 3/2012 |
| JP | 2014-198518 A | 10/2014 |
| JP | 2014-198779 A | 10/2014 |
| JP | WO 2014156741 A1 * | 10/2014 |
| WO | WO 2011/122876 A2 * | 10/2011 |

OTHER PUBLICATIONS

Extended European Search Report dated Jul. 5, 2017, issued in corresponding EP Patent Application EP 15844608.8.
Arun, A. et al., " Tri-block copolymers with mono-disperse crystallizable diamide segments: Synthesis, analysis and eological properties", Polymer, vol. 49, No. 10, p. 2461-2470, May 13, 2008.

* cited by examiner

*Primary Examiner* — Ana L. Woodward
(74) *Attorney, Agent, or Firm* — Solaris Intellectual Property Group, PLLC

(57) ABSTRACT

A tire including a tire skeleton body that is made of a resin material containing a polyamide-based thermoplastic elastomer and has a ring shape, wherein the polyamide-based thermoplastic elastomer includes a hard segment, a soft segment consisting of a constituent unit derived from polypropylene glycol, and a binding portion that binds two or more segments and that consists of a constituent unit derived from a dicarboxylic acid of from 6 to 20 carbons, the polyamide-based thermoplastic elastomer having a weight average molecular weight of from 20,000 to 250,000.

7 Claims, 3 Drawing Sheets

TIRE

TECHNICAL FIELD

The present invention relates to a tire attached to a rim, in particular, to a tire including a tire case at least a part of which is made of a resin material.

BACKGROUND ART

Conventionally, pneumatic tires which are constructed of rubber, organic fiber materials, steel members, and so on are used for vehicles such as passenger cars.

In order to meet the demand, it has been examined in recent years to use resin materials, in particular, thermoplastic resins, thermoplastic elastomers, and so on as a tire material because of easiness of weight saving or molding, or recycle efficiency. These thermoplastic polymer materials (such as thermoplastic elastomers and thermoplastic resin materials) have many advantages from the viewpoint of productivity improvement, such as injection-molding capability. For example, a tire is proposed which is manufactured by using a polyamide-based thermoplastic elastomer as a thermoplastic polymer material (see Japanese Patent Application Laid-Open (JP-A) No. 2012-45790).

SUMMARY OF INVENTION

Technical Problem

Tires made by using thermoplastic polymer materials are easy to manufacture and lower in cost than usual rubber tires. However, there is a further desire not only to increase manufacturing efficiency and achieve low cost, but also to achieve performance (characteristics required of a tire) that compares favorably with the conventional rubber tires. Examples of the characteristics required of a tire include low rolling resistance (low-loss property), heat resistance, and excellent rim fittability (not only the tire can be fitted to a rim, but also air thereinside is prevented from leaking out when the tire is fitted to the rim). Additionally, examples of characteristics required to increase manufacturing efficiency for a tire include a reaction speed (reactivity) in synthesizing a polymer material and excellent injection moldability in injection molding a polymer material.

Thus, tires using a thermoplastic polymer material are required to have a balance between high manufacturing efficiency, low-loss property, heat resistance, and excellent rim fittability.

In view of the situation mentioned above, it is an object of one embodiment of the present invention to provide a tire which is made by using a resin material and has an excellent balance of manufacturing efficiency, low-loss property, heat resistance, and rim fittability.

Solution to Problem

A tire including a tire skeleton body that is made of a resin material containing a polyamide-based thermoplastic elastomer and has a ring shape, in which the polyamide-based thermoplastic elastomer includes a hard segment, a soft segment consisting of a constituent unit derived from polypropylene glycol, and a binding portion that binds two or more segments and that consists of a constituent unit derived from a dicarboxylic acid of from 6 to 20 carbons, the polyamide-based thermoplastic elastomer having a weight average molecular weight of from 20,000 to 250,000.

Advantageous Effects of the Invention

According to one embodiment of the invention, a tire that is formed by using a resin material and that is well-balanced and excellent in manufacturing efficiency, low-loss property, heat resistance, and rim fittability can be provided.

DESCRIPTION OF EMBODIMENTS

Figure 1A:
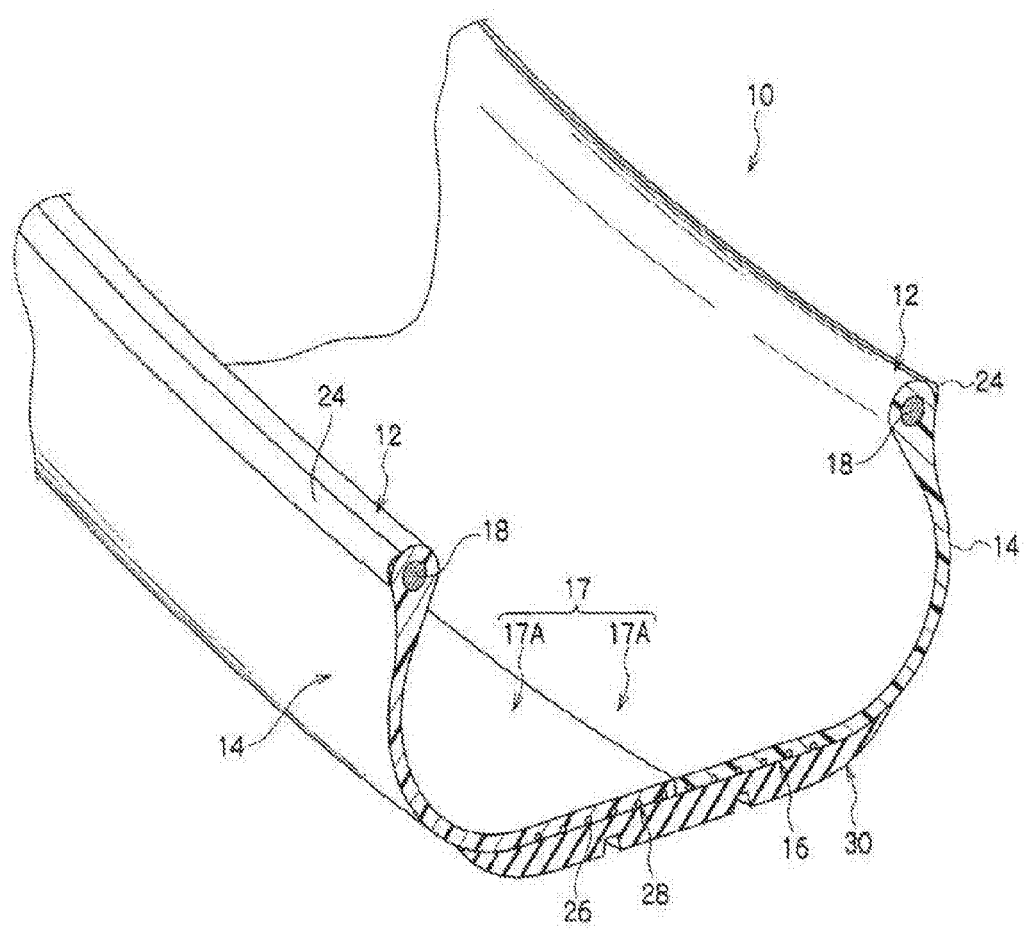
FIG. 1A is a perspective view of the cross-section of a part of the tire according to one embodiment of the invention.

The tire according to one embodiment of the invention has an annular tire skeleton body made of a resin material including a polyamide-based thermoplastic elastomer. The polyamide-based thermoplastic elastomer includes a hard segment, a soft segment consisting of a constituent unit derived from polypropylene glycol, and a binding portion that binds two or more segments and that consists of a constituent unit derived from a dicarboxylic acid of from 6 to 20 carbons, and the weight average molecular weight of the polyamide-based thermoplastic elastomer is from 20,000 to 250,000.

In one embodiment of the invention, the tire skeleton body includes a polyamide-based thermoplastic elastomer that satisfies the above conditions regarding all of the constituent unit of the soft segment, the constituent unit of the binding portion, and the weight average molecular weight, so that the tire is well-balanced and excellent in manufacturing efficiency, low-loss property, heat resistance, and rim fittability.

Specifically, for example, in one embodiment of the invention, particularly, low-loss property can be improved while maintaining manufacturing efficiency, heat resistance, and rim fittability, as compared to the case of a soft segment including a constituent unit derived from polytetramethylene ether glycol (PTMG). Although the reason for that is unclear, it is speculated that, since polypropylene glycol used as a polymer which forms the soft segment is non-crystalline, the low-loss property of the tire is excellent as compared to the case in which crystalline PTMG is included.

Additionally, one embodiment of the invention can provide a well-balanced tire in which manufacturing efficiency is improved while maintaining low-loss property, and additionally, heat resistance and rim fittability are also excellent, as compared to cases in which the number of carbon atoms of the dicarboxylic acid included in the binding portion is outside the above range. It is unclear why the manufacturing efficiency is improved by a dicarboxylic acid having the number of carbon atoms in the range. However, the use of a dicarboxylic acid having the number of carbon atoms in the range is speculated to increase a reaction speed (reactivity) in synthesizing a polyamide-based thermoplastic elastomer, thereby improving the manufacturing efficiency.

Additionally, one embodiment of the invention can provide a tire well-balanced and excellent in all of manufacturing efficiency, low-loss property, heat resistance, and rim fittability as compared to the case of a polyamide-based thermoplastic elastomer having a weight average molecular weight outside the above range. Specifically, in one embodiment of the invention, the tire is excellent, particularly, in injection moldability among manufacturing efficiencies, and also excellent in low-loss property and rim fittability as compared to cases in which the weight average molecular weight is lower than the range. Additionally, the tire is excellent in injection moldability, rim fittability, and heat resistance as compared to cases in which the weight average molecular weight is higher than the range.

Thus, the tire to which the above-described polyamide-based thermoplastic elastomer is applied is formed by using a resin material, and will be well-balanced and excellent in manufacturing efficiency, low-loss property, heat resistance, and rim fittability.

<<Resin Material>>

As mentioned above, the tire has a tire skeleton body formed by using a resin material including a polyamide-based thermoplastic elastomer. Then, the polyamide-based thermoplastic elastomer includes at least a hard segment, a soft segment including a constituent unit derived from polypropylene glycol, and a binding portion that binds two or more segments and that includes a constituent unit derived from a dicarboxylic acid of from 6 to 20 carbons, and the weight average molecular weight of the elastomer is from 20,000 to 250,000.

As used herein, a "binding portion" refers to a binding portion that binds two or more segments. Specific examples of the binding portion include, for example, a binding portion between the hard segment and the soft segment, a binding portion between the hard segments, and a binding portion between the soft segments. Examples of the binding portion include, for example, a portion bound by a chain extender described below.

In this regard, the resin material may contain a thermoplastic elastomer other than the above-described thermoplastic elastomer, or any optional component. As used herein, the term "resin" has a concept covering a thermoplastic resin and a thermosetting resin, but does not include natural rubber.

As used herein, a numerical range indicated using "to" means a range including the figures written before and after "to" as the minimum value and the maximum value respectively.

In a case in which a plurality of substances corresponding to each component are present in a composition described herein, the amount of each component in the composition means the total amount of the plurality of substances present in the composition, unless otherwise specified.

[Polyamide-Based Thermoplastic Elastomer]

As used herein, the term "polyamide-based thermoplastic elastomer" means a thermoplastic elastomer consisting of a copolymer including a polymer which forms a crystalline hard segment having a high melting point and a polymer which forms a non-crystalline soft segment having a low glass transition temperature, which resin material has an amide bond (—CONH—) on a main chain of the polymer which forms the hard segment.

Examples of the polyamide-based thermoplastic elastomers include a material in which at least polyamide forms a hard segment which is crystalline and has a high melting point, polypropylene glycol forms a soft segment which is non-crystalline and has a low glass transition temperature, and a chain extender that is a dicarboxylic acid of from 6 to 20 carbons forms a binding portion.

—Hard Segment—

Examples of polyamides which form the hard segment can include a polyamide synthesized by using a monomer represented by the following general Formula (1) or the general Formula (2):

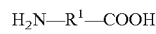

$H_2N$—$R^1$—COOH     Formula (1)

In general Formula (1), $R^1$ represents a molecular chain of a hydrocarbon of from 2 to 20 carbons or an alkylene group of from 2 to 20 carbons.

Formula (2)

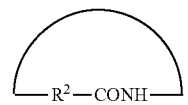

In general Formula (2), $R^2$ represents a molecular chain of a hydrocarbon of from 3 to 20 carbons or an alkylene group of from 3 to 20 carbons.

In general Formula (1), $R^1$ is preferably a molecular chain of a hydrocarbon of from 3 to 18 carbons or an alkylene group of from 3 to 18 carbons, more preferably a molecular chain of a hydrocarbon of from 4 to 15 carbons or an alkylene group of from 4 to 15 carbons, and particularly preferably a molecular chain of a hydrocarbon of from 10 to 15 carbons or an alkylene group of from 10 to 15 carbons. In general Formula (2), $R^2$ is preferably a molecular chain of a hydrocarbon of from 3 to 18 carbons or an alkylene group of from 3 to 18 carbons, more preferably a molecular chain of a hydrocarbon of from 4 to 15 carbons or an alkylene group of from 4 to 15 carbons, and particularly preferably a molecular chain of a hydrocarbon of from 10 to 15 carbons or an alkylene group of from 10 to 15 carbons.

Examples of monomers represented by general Formula (1) or general Formula (2) include ω-aminocarboxylic acids and lactams. Examples of polyamides which form the hard segment include polycondensation products of these ω-aminocarboxylic acids and of lactams, and copolycondensation products of diamines with dicarboxylic acids.

Examples of the ω-aminocarboxylic acids include aliphatic ω-aminocarboxylic acids of from 5 to 20 carbons, such as 6-aminocaproic acid, 7-aminoheptanoic acid, 8-aminooctanoic acid, 10-aminocapric acid, 11-aminoundecanoic acid, and 12-aminododecanoic acid. Examples of the lactams include aliphatic lactams of from 5 to 20 carbons, such as lauryl lactam, ε-caprolactam, undecanelactam, ω-enantholactam, and 2-pyrrolidone.

Examples of the diamines include diamine compounds of, for example, aliphatic diamine of from 2 to 20 carbons, such as ethylenediamine, trimethylenediamine, tetramethylenediamine, hexamethylenediamine, heptamethylenediamine, octamethylenediamine, nonamethylenediamine, decamethylenediamine, undecamethylenediamine, dodecamethylenediamine, 2,2,4-trimethylhexamethylenediamine, 2,4,4-trimethylhexamethylenediamine, 3-methylpentamethylenediamine, and meta-xylene diamine. Dicarboxylic acids can be represented by HOOC—$(R^3)$m-COOH($R^3$: molecular chain of hydrocarbon of from 3 to 20 carbons, m: 0 or 1), and the examples thereof include aliphatic dicarboxylic acids of from 2 to 22 carbons, such as oxalic acid, succinic acid, glutaric acid, adipic acid, pimelic acid, suberic acid, azelaic acid, sebacic acid, and dodecanedioic acid.

Examples of the polyamides which form the hard segment include a polyamide from the polycondensation cleavage of ε-caprolactam (polyamide 6), a polyamide from the polycondensation cleavage of undecanelactam (polyamide 11), a polyamide from the polycondensation cleavage of lauryl lactam (polyamide 12), a polyamide from polycondensation of 12-aminododecanoic acid (polyamide 12), a polyamide from polycondensation of diamine with dibasic acid (polyamide 66), a polyamide from polymerization of hexamethylenediamine and dodecanedicarboxylic acid (polyamide 612), or a polyamide including meta-xylene diamine as a constituent unit (amide MX).

The polyamide 6 can be represented by, for example, $\{CO-(CH_2)_5-NH\}_n$ (n represents an optional number of repeating units), and, for example, n is preferably from 2 to 100, and more preferably from 3 to 50.

The polyamide 11 can be represented by, for example, $\{CO-(CH_2)_{10}-NH\}_n$ (n represents an optional number of repeating units), and, for example, n is preferably from 2 to 100, and more preferably from 3 to 50.

The polyamide 12 can be represented by, for example, $\{CO-(CH_2)_{11}-NH\}_n$ (n represents an optional number of repeating units), and, for example, n is preferably from 2 to 100, and more preferably from 3 to 50.

The polyamide 66 can be represented by, for example, $\{CO(CH_2)_4CONH(CH_2)_6NH\}_n$ (n represents an optional number of repeating units), and, for example, n is preferably from 2 to 100, and more preferably from 3 to 50.

The polyamide 612 can be represented by, for example, $\{CO(CH_2)_{12}CONH(CH_2)_6NH\}_n$ (n represents an optional number of repeating units), and, for example, n is preferably from 2 to 100, and more preferably from 3 to 50.

An amide MX having a meta-xylene diamine as a constituent unit can be represented by, for example, the following constituent unit (A-1) [wherein n is an optional number of the repeating unit], and n is, for example, preferably from 2 to 100, and more preferably from 3 to 50.

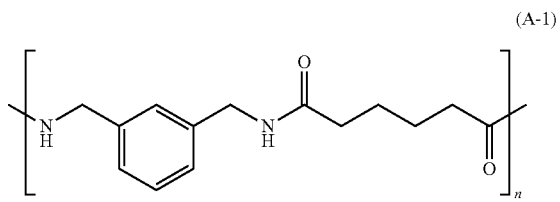

(A-1)

The polyamide-based thermoplastic elastomer has preferably a polyamide (polyamide 12) including a unit structure represented by $[CO-(CH_2)_{11}-NH]-$ as a hard segment. As mentioned above, the polyamide 12 can be obtained by the polycondensation cleavage of lauryl lactam or the polycondensation of 12-aminododecanoic acid.

Particularly, from the viewpoint of the balance between low-loss property, heat resistance, and excellent rim fittability, the polyamide-based thermoplastic elastomer preferably includes, particularly, as the hard segment, at least one of a polyamide (polyamide 12) including the unit structure represented by $-[CO-(CH_2)_{11}-NH]-$, a polyamide (polyamide 6) including a unit structure represented by $-[CO-(CH_2)_5-NH]-$, or a polyamide (polyamide 612) including a unit structure represented by $-[CO(CH_2)_{12}CONH(CH_2)_6NH]-$.

The number average molecular weight of the polymer which forms the hard segment (polyamide) is preferably from 300 to 15,000 from the viewpoint of the melt molding property.

—Soft Segment—

As described above, the soft segment consists of a constituent unit derived from polypropylene glycol. Specifically, the soft segment is composed of only polypropylene glycol.

As the polymer (polypropylene glycol) which forms the soft segment, there may be mentioned polypropylene glycol having a hydroxyl group at both terminals thereof and polypropylene glycol derivatives having a functional group introduced at a terminal thereof.

The functional group at the terminal of the polypropylene glycol can be any one as long as the functional group reacts with a carboxyl group of a dicarboxylic acid serving as the chain extender so that polypropylene glycol is bound with the dicarboxylic acid, and examples of the functional group include amino groups.

Specifically, examples of the polypropylene glycol derivatives include polyoxypropylene diamine obtained by reacting ammonia or the like with a terminal of polypropylene glycol having a hydroxyl group at both terminals thereof.

Hereinafter, polypropylene glycols having a hydroxyl group at both terminals thereof and the polypropylene glycol derivatives may be generically named as "polypropylene glycol".

The polypropylene glycol which forms the soft segment has a number average molecular weight of preferably from 200 to 6000, more preferably from 400 to 4000, and particularly preferably from 650 to 2000, from the viewpoint of toughness and low-temperature flexibility.

Polypropylene glycol can be manufactured by any known method. Specifically, for example, polypropylene glycol can be obtained by anionic ring-opening polymerization reaction of propylene oxide. Alternatively, the soft segment may be formed by using a commercially available polypropylene glycol.

Examples of combinations of the hard segments and the soft segments can include combinations of each of the above recited hard segments and the soft segments. Among the combinations, preferred are a combination of a polycondensation cleavage product of lauryl lactam/polyethylene glycol and a combination of a polycondensation cleavage product of aminododecanoic acid/polypropylene glycol.

—Binding Portion—

As described above, the binding portion consists of a constituent unit derived from a dicarboxylic acid of from 6 to 20 carbons. Specifically, the binding portion is composed of only a chain extender that is a dicarboxylic acid of from 6 to 20 carbons.

The chain extender to form the binding portion can be any one as long as the agent is a dicarboxylic acid of from 6 to 20 carbons. Specific examples thereof include aliphatic dicarboxylic acids, alicyclic dicarboxylic acids, and aromatic dicarboxylic acids, and these compounds may be used singularly or in combination of two or more kinds thereof. Among them, as the chain extender, aliphatic dicarboxylic acids are preferable, linear aliphatic dicarboxylic acids are more preferable, linear aliphatic dicarboxylic acids of from 8 to 20 carbons are still more preferable, linear aliphatic dicarboxylic acids of from 10 to 18 carbons are particularly preferable, and linear aliphatic dicarboxylic acids of from 12 to 18 carbons are still further more preferable.

Specific examples of the dicarboxylic acid include linear aliphatic dicarboxylic acids of from 6 to 20 carbons, such as adipic acid (hexanedioic acid), 1,10-decane dicarboxylic acid (dodecanedioic acid), pimelic acid (heptanedioic acid), suberic acid (octanedioic acid), azelaic acid (nonanedioic acid), sebacic acid (decanedioic acid), and eicosanedioic acid; aliphatic dicarboxylic acids such as dimerized aliphatic dicarboxylic acids of from 14 to 20 carbons obtained by dimerization of unsaturated fatty acids obtained by fractional distillation of triglycerides and hydrogenated products thereof; alicyclic dicarboxylic acids of from 6 to 20 carbons, such as 1,4-cyclohexanedicarboxylic acid; and aromatic dicarboxylic acids of from 6 to 20 carbons, such as terephthalic acid and isophthalic acid. Among them, adipic acid, dodecanedioic acid, and eicosanedioic acid are preferable.

—Molecular Weight—

The weight average molecular weight of the polyamide-based thermoplastic elastomer included in the resin material is from 20,000 to 250,000. In a case in which the weight average molecular weight of the polyamide-based thermoplastic elastomer is less than 20,000, fittability to a rim is reduced. In a case in which the weight average molecular weight of the polyamide-based thermoplastic elastomer is greater than 250,000, the melt viscosity increases and may undesirably cause insufficient filling in forming a tire skeleton body, and hence it may be necessary to increase forming temperature and mold temperature. Accordingly, it may be necessary to set high molding temperature and high mold temperature. In a case in which the forming temperature and the mold temperature are increased in order to prevent insufficient filling, the cycle time becomes longer and productivity (manufacturing efficiency) is decreased.

The weight average molecular weight of the polyamide-based thermoplastic elastomer is preferably from 50,000 to 200,000, more preferably from 60,000 to 200,000, still more preferably from 80,000 to 160,000, and particularly preferably from 100,000 to 150,000. Additionally, particularly from the viewpoint of heat resistance and rim fittability, the weight average molecular weight of the polyamide-based thermoplastic elastomer may be from 100,000 to 180,000, may be from 150,000 to 180,000, or may be from 170,000 to 180,000.

The weight average molecular weight of the polyamide-based thermoplastic elastomer can be measured by gel permeation chromatography (GPC), and, for example, a GPC (gel permeation chromatography) such as "HLC-8320GPC EcoSEC" available from Tosoh Corporation can be used.

In the polyamide-based thermoplastic elastomer, a ratio (x/y) of a mass of the hard segment (x) to a mass of the soft segment (y) is, for example, from 40/60 to 90/10. From the viewpoint that the balance between low-loss property, heat resistance, and rim fittability can be achieved, a ratio of from 54/46 to 90/10 is preferable, a ratio of from 54/46 to 88/12 is more preferable, a ratio of from 55/45 to 85/15 is still more preferable, and a ratio of from 60/40 to 75/25 is particularly preferable.

Throughout the present specification, "x" represents a mass of the hard segment included in the polyamide-based thermoplastic elastomer, and "y" represents a mass of the soft segment included in the polyamide-based thermoplastic elastomer. Additionally, "x/y" represents "the mass of the hard segment (x)/the mass of the soft segment (y)".

A content of the hard segment in the polyamide-based thermoplastic elastomer is preferably from 5 to 95% by mass, more preferably from 10 to 90% by mass, and particularly preferably from 15 to 90% by mass with respect to the total amount of the polyamide-based thermoplastic elastomer.

A soft segment content in the polyamide-based thermoplastic elastomer is preferably from 10 to 95% by mass, and more preferably from 10 to 90% by mass, with respect to the total amount of the polyamide-based thermoplastic elastomer.

An amount of the chain extender is preferably set so that a functional group (for example, a hydroxyl group or amino group) at the terminals of polypropylene glycol which forms the soft segment and a carboxyl group of the chain extender are substantially equimolar.

—Manufacturing Method—

The polyamide-based thermoplastic elastomer can be synthesized by copolymerizing, by using well-known methods, a polymer which forms the hard segment and a polymer which forms the soft segment.

For example, the polyamide-based thermoplastic elastomer can be obtained by polymerizing a monomer which forms the hard segment (for example, ω-aminocarboxylic acid such as 12-aminododecanoic acid or lactam such as lauryl lactam) and a chain extender (for example, adipic acid or decanedicarboxylic acid) in a vessel and then further polymerizing with the addition of a polymer (polypropylene glycol) which forms the soft segment.

In particular, in a case in which ω-aminocarboxylic acid is used as a monomer which forms the hard segment, the synthesis can be done by performing melt-polymerization at ambient pressure, or melt-polymerization at ambient pressure followed by melt-polymerization at reduced pressure. In a case in which lactam is used as a monomer which forms the hard segment, the elastomer can be manufactured by a method consisting of melt polymerization under a pressure of from 0.1 to 5 MPa with the coexistence of an appropriate amount of water, followed by melt-polymerization at ambient pressure and/or melt-polymerization at reduced pressure. These synthetic reactions can be performed either in a batch method or in a continuous method. For the above-mentioned synthetic reactions, a batch type reaction tank, a single-tank type or multi-tank type continuous reaction device, a tube-shaped continuous reaction device, and so on may be used singly or in combination thereof, if appropriate.

In manufacturing the polyamide-based thermoplastic elastomer, polymerization temperature is preferably from 150 to 300° C. and more preferably from 160 to 280° C. Polymerization time can be appropriately determined from the relation between the polymerization average molecular weight of a polyamide-based thermoplastic elastomer to be synthesized and the polymerization temperature thereof, and is preferably from 0.5 to 30 hours, and more preferably from 0.5 to 20 hours.

In manufacturing the polyamide-based thermoplastic elastomer, an additive such as monoamines or diamines, for example, lauryl amine, stearylamine, hexamethylenediamine, and meta-xylylenediamine; or monocarboxylic acids or dicarboxylic acids, for example, acetic acid, benzoic acid, stearic acid, adipic acid, sebacic acid, and dodecanedioic acid; and the like may be added in order to adjust molecular weight or stabilize melt viscosity during mold processing, as needed. These additives can be selected, as appropriate, in consideration of properties, such as molecular weight and viscosity, of a polyamide-based thermoplastic elastomer to be obtained so long as the additives do not adversely affect the advantageous effects of the invention.

In manufacturing the polyamide-based thermoplastic elastomer, a catalyst can be used, as needed. Examples of the catalysts include a compound containing at least one kind selected from the group consisting of P, Ti, Ge, Zn, Fe, Sn, Mn, Co, Zr, V, Ir, La, Ce, Li, Ca, and Hf.

Examples of the catalysts include, for example, inorganic phosphoric compounds, organic titanium compounds, organic zirconium compounds, and organotin compounds.

Specifically, examples of the inorganic phosphoric compounds include a phosphorus acid such as phosphoric acid, pyrophosphoric acid, polyphosphoric acid, phosphorous acid, or hypophosphorous acid, an alkali metal salt of the phosphorus acid, and an alkaline earth metal salt of the phosphorus acid.

Examples of the organic titanium compounds include a titanium alkoxide [such as titanium tetrabutoxide, or titanium tetraisopropoxide].

Examples of the organic zirconium compounds include a zirconium alkoxide [such as zirconium tetrabutoxide (also referred to as "Zr(OBu)$_4$" or "Zr(OC$_4$H$_8$)$_4$;")].

Examples of the organotin compounds include a distannoxane compound [such as 1-hydroxy-3-isothiocyanate-1,1,3,3-tetrabutyl distannoxane], tin acetate, dibutyl tin dilaurate, and butyltin hydroxide oxide hydrate.

The amount of the catalyst to be added and the timing of the addition are not particularly limited so long as these conditions can provide a target product rapidly.

Preferable examples of the polyamide-based thermoplastic elastomer include a combination of a polycondensation cleavage product of lauryl lactam/polypropylene glycol/adipic acid, a combination of a polycondensation cleavage product of lauryl lactam/polypropylene glycol/decanedicarboxylic acid, a combination of a polycondensation product of aminododecanoic acid/polypropylene glycol/adipic acid, and a combination of a polycondensation product of aminododecanoic acid/polypropylene glycol/decanedicarboxylic acid. As the polyamide-based thermoplastic elastomer, a combination of the above described preferred aspects can be used regarding the combination of the constitutional units, the constitutional ratio, the molecular weight, and so on.

The resin material may contain a various additives such as rubber, a various fillers (such as silica, calcium carbonate and clay), an antioxidant, an oil, a plasticizer, a colorant, a weathering stabilizer, and a reinforcing material. The additives have no particular limitation on the content thereof in the resin material (tire skeleton body) and can be used, if appropriate, so long as the additives do not harm the advantageous effects of the invention. In a case in which a component such as the additive other than the resin material is added, the content of a resin component in the resin material is preferably 50% by mass or more, and more preferably 90% by mass or more with respect to the total amount of the resin material. The content of the resin component in the resin material is a remaining part after subtracting the total content of the various additives from the total amount of the resin material.

[Physical Properties of Resin Material]

Next, preferred physical properties of the resin material of which a tire skeleton body is made will be described. The tire skeleton body is formed by using the above-mentioned resin material.

The melting point (or softening point) of the resin material itself (tire skeleton body) is usually from 100° C. to 350° C., and preferably about from 100° C. to 250° C. However, from the viewpoint of productivity of the tire, the melting point (or softening point) is preferably about from 120° C. to 250° C., and more preferably about from 140° C. to 230° C.

Thus, in a case in which the skeleton body of a tire is made, for example, by fusing the divided bodies (skeleton pieces), sufficient adhesion intensity between the tire skeleton pieces can be obtained by using a resin material having a melting point of from 120° C. to 250° C., even if the body is formed by the fusion at a temperature around the range from 120° C. to 250° C. Accordingly, the tire is excellent in durable properties during running, such as puncture resistance and abrasion resistance. The heating temperature is preferably higher than the melting point (or softening point) of the resin material included in the tire skeleton body by from 10° C. to 150° C., and more preferably from 10° C. to 100° C.

The resin material can be obtained by adding various additives as needed and appropriately mixing them by well-known methods (for example melt mixing). The resin material obtained by melt mixing can be used, as needed, in the form of a pellet.

The tensile yield strength of the resin material (tire skeleton body) itself defined by JIS K7113: 1995 is preferably 5 MPa or more, more preferably from 5 MPa to 20 MPa, and still more preferably from 5 MPa to 17 MPa. In a case in which the tensile yield strength of the resin material is 5 MPa or more, the tire can endure deformation due to a load thereon during driving.

The tensile yield elongation of the resin material (tire skeleton body) itself defined in JIS K7113:1995 is preferably 10% or more, preferably from 10% to 70% and more preferably from 15% to 60%. In a case in which the tensile yield elongation of the resin material is 10% or more, the elastic region of the material can become large, resulting in the improved air-sealing property thereof.

The tensile breaking elongation of the resin material (tire skeleton body) itself defined in JIS K7113:1995 is preferably 50% or more, preferably 100% or more, more preferably 150% or more, and particularly preferably 200% or more. In a case in which the tensile breaking elongation of the resin material is 50% or more, the rim fittability of the material is excellent and the collisional destruction of the resin can be suppressed.

The load deflection temperature (under 0.45 MPa load) of the resin material (tire skeleton body) itself defined in ISO75-2 or ASTM D648 is preferably 50° C. or more, preferably from 50° C. to 150° C., and more preferably from 50° C. to 130° C. In a case in which the load deflection temperature of the resin material is 50° C. or more, the deformation of the tire skeleton body can be suppressed even if vulcanization is performed during manufacturing the tire.

First Embodiment

A tire according to the first embodiment of the invention will now be described by way of drawings.

Figure 1B:
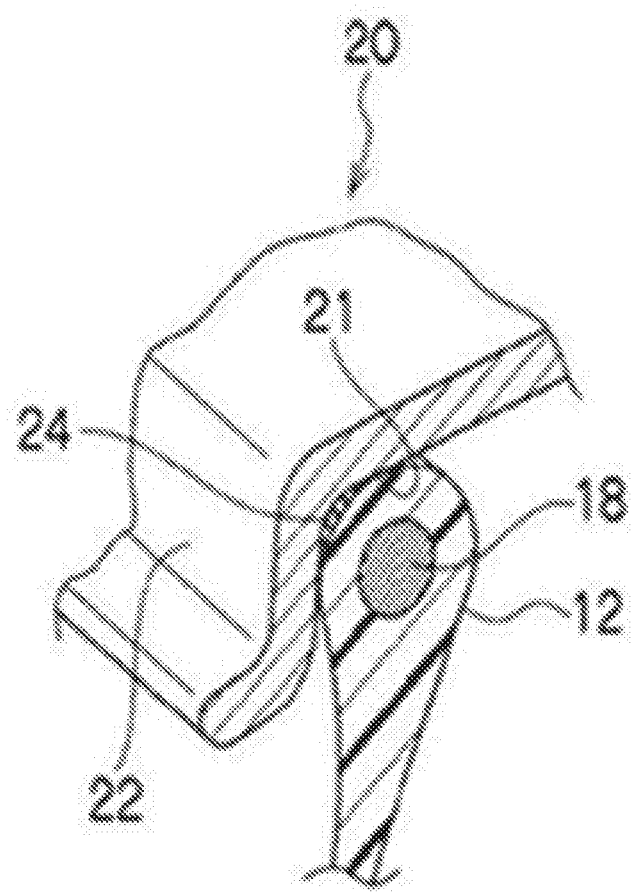
FIG. 1B is a cross-sectional view of a bead part attached to a rim.

A tire 10 of the embodiment will be described. FIG. 1A is a perspective view of the cross-section of a part of the tire according to one embodiment of the invention. FIG. 1B is a cross-sectional view of a bead part attached to a rim. As can be seen in the FIG. 1A, the tire 10 of the embodiment has a cross-sectional shape roughly similar to that of conventional general pneumatic tires made of rubber.

As can be seen in the FIG. 1A, the tire 10 is provided with a tire case 17 (tire skeleton body) constituted by a pair of bead parts 12 which comes in contact with a bead seat 21 and a rim flange 22 of a rim 20 depicted in the FIG. 1B, side parts 14 extending from the bead parts 12 in the outward radial direction of the tire, and a crown part 16 (outer peripheral part) connecting an outward end of the one side part 14 in the radial direction of the tire with the other outward end of the other side part 14 in the radial direction of the tire.

Here, in the tire case 17 of the present embodiment, for example, a resin material can be used that is prepared by adding respective additives to a polyamide-based thermoplastic elastomer that includes a hard segment, a soft segment including a constituent unit derived from polypropylene glycol, and a binding portion that binds two or more segments and that includes a constituent unit derived from a dicarboxylic acid of from 6 to 20 carbons, and that has a weight average molecular weight of from 20,000 to 250,000.

In the embodiment, the tire case 17 is made of a single resin material, but the invention is not limited to this configuration, and a thermoplastic resin material having different properties may be applied to respective parts of the tire case 17 (such as the side parts 14, the crown part 16, and the bead parts 12) as in the case of conventional general pneumatic tires made of rubber. In the tire case 17 (for example, the bead parts 12, the side parts 14, and the crown part 16), a reinforcing material (such as polymer material, metal fiber, cord, unwoven cloth, or woven cloth) can be embedded and arranged to reinforce the tire case 17.

The tire case 17 of the embodiment is made by bonding a pair of tire case half bodies (tire skeleton pieces) 17A made of the resin material. The tire case half bodies 17A are formed by bonding the ring-shaped tire case half bodies 17A of the same shape opposite to each other at the tire equatorial plane, which half bodies include a bead part 12, a side part 14, and a crown part 16 of half width, and are integrally formed, for example, by injection-molding. The tire case 17 is not limited to the example made by bonding the two members and can be made by bonding three or more members.

The tire case half body 17A made of the resin material can be formed by, for example, vacuum molding, compression molding, injection-molding, or melt casting. Accordingly, vulcanization is not necessary in contrast to making a tire case of rubber as in the conventional case, and not only manufacturing steps can be significantly simplified but also forming time can be omitted.

In the embodiment, the tire case half bodies 17A are of a left-right symmetrical shape, in other words, the one tire case half body 17A and the other tire case half body 17A are of the same shape, which results in an advantage that only one type of metal mold is required for forming the tire case half bodies 17A.

In the embodiment, as shown in the FIG. 1B, a ring-shaped bead core 18 consisting of a steel cord is embedded in the bead part 12 as in the case of conventionally general pneumatic tires. However, the invention is not limited to this configuration, and the bead core 18 can be omitted so long as the stiffness of the bead part 12 is ensured and the engagement thereof to the rim 20 is not problematic. An organic fiber cord, a resin-covered organic fiber cord, or a hard resin is applicable instead of the steel cord.

In the embodiment, a ring-shaped seal layer 24 made of a material, such as rubber, having a sealing property superior to that of the resin material of which the tire case 17 is made is formed on a part of the bead part 12 which comes in contact with the rim 20 and a part thereof which comes in contact with at least a rim flange 22 of the rim 20. The seal layer 24 may also be formed on a part where the tire case 17 (bead part 12) and a bead seat 21 contact each other. A softer material than the resin material of which the tire case 17 is made can be used as a material with a sealing property superior to that of the resin material of which the tire case 17 is made. As a rubber applicable to the seal layer 24, it is preferable to use the same sort of rubber as that used on the outer surface of the bead part of conventionally general pneumatic tires made of rubber. Other thermoplastic resins (thermoplastic elastomers) having a sealing property superior to that of the resin material can also be used. Examples of these thermoplastic resins include polyurethane-based resin, polyolefin-based resin, polystyrene-based thermoplastic resin and polyester resin, and blends of these resins with rubber or elastomer. Thermoplastic elastomers also may be used and examples thereof include, for example, a polyester-based thermoplastic elastomer, a polyurethane-based thermoplastic elastomer, a polystyrene-based thermoplastic elastomer, a polyolefin-based thermoplastic elastomer, or any combination among these elastomers, and any blend of these elastomers with rubber.

As can be seen in the FIG. 1A, a reinforcing cord 26 with higher stiffness than that of the resin material of which the tire case 17 is made is wound around the crown part 16 in the circumferential direction of the tire case 17. The reinforcing cord 26 is, as seen in the cross-sectional view along the axial direction of the tire case 17, helically wound with at least a part thereof embedded in the crown part 16, and forms a cord-reinforced layer 28. A tread 30 made of a material, such as rubber, having wear resistance superior to that of the resin material of which the tire case 17 is made is arranged on the outer peripheral side of the cord-reinforced layer 28 in the direction of tire diameter.

Figure 2:
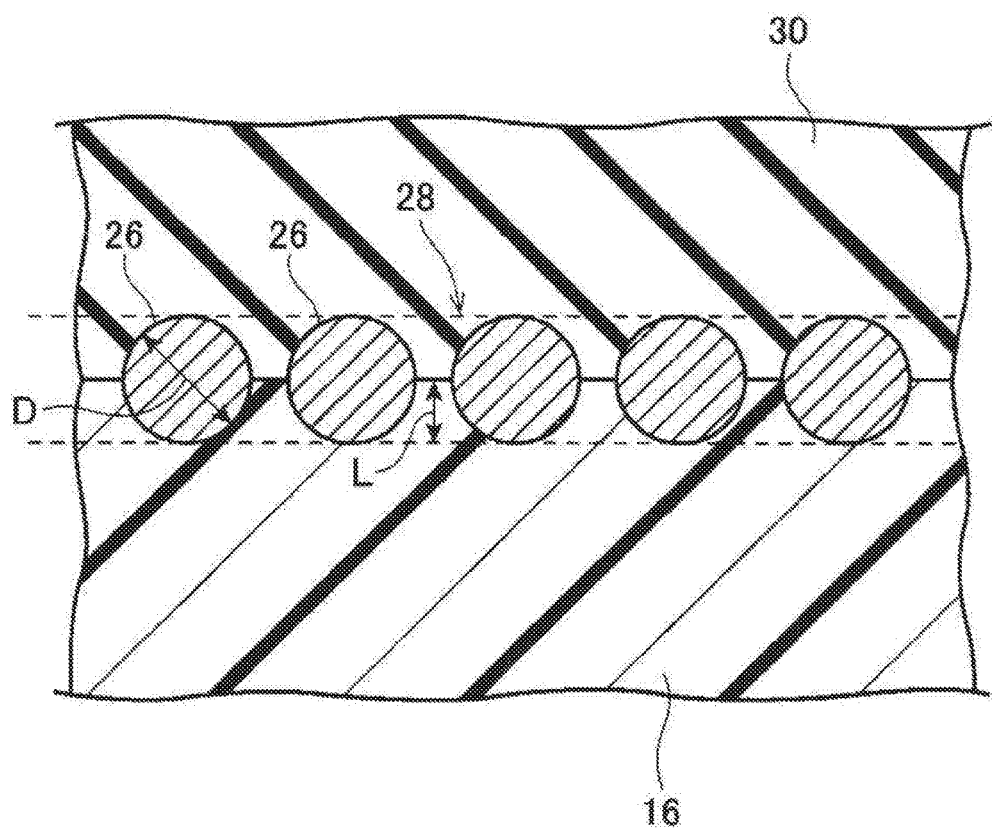
FIG. 2 is a cross-sectional view along a tire rotational axis which depicts the reinforcing cord embedded in a crown part of a tire case of the tire according to the first embodiment.

The cord-reinforced layer 28 formed by the reinforcing cord 26 will be described by using FIG. 2. FIG. 2 is a cross-sectional view along the tire rotational axis which depicts the reinforcing cord embedded in the crown part of the tire case of the tire according to the first invention. As can be seen in the FIG. 2, in the cross-sectional view along axial direction of the tire case 17, the reinforcing cord 26 is helically wound with at least a part thereof embedded in the crown part 16, and forms the cord-reinforced layer 28 represented by a dashed line part in the FIG. 2 along with a part of the outer peripheral part of the tire case 17. The part of the reinforcing cord 26 embedded in the crown part 16 is attached to the resin material of which the crown part 16 (tire case 17) is made. A mono-filament (single wire) such as a metal fiber or an organic fiber, or a multi-filament (stranded wire) formed by stranding these fibers such as a steel cord of stranded steel fiber can be used as the reinforcing cord 26. In the embodiment, a steel cord is used as the reinforcing cord 26.

In the FIG. 2, the embedded amount L represents an embedded amount of the reinforcing cord 26 into the tire case 17 (crown part 16) in the direction of the rotational axis of the tire. The embedded amount L of the reinforcing cord 26 into the crown part 16 is preferably ⅕ or more of the diameter D of the reinforcing cord 26, and more preferably more than ½. Further, the entire reinforcing cord 26 is most preferably embedded in the crown part 16. In a case in which the embedded amount L of the reinforcing cord 26 exceeds ½ of the diameter D of the reinforcing cord 26, the reinforcing cord 26 hardly gets out of the embedding part due to the size. In a case in which the entire reinforcing cord 26 is embedded in the crown part 16, the surface of the tire case (outer peripheral surface) becomes flat, and air penetration into the surrounding part of the reinforcing cord can be suppressed even in a case in which a member is mounted on the crown part 16 where the reinforcing cord 26 is embedded. The cord-reinforced layer 28 corresponds to a belt arranged on the outer peripheral surface of the carcass of conventional pneumatic tires made of rubber.

As mentioned above, the tread 30 is arranged on the outer peripheral side of the cord-reinforced layer 28 in the radial direction of the tire. Rubber used for this tread 30 is preferably the same sort of rubber as that used for conventional pneumatic tires made of rubber. A tread made of other sort of resin material having wear resistance superior to that of the resin material which forms the tire case 17 may be used instead of the tread 30. The tread 30 has a tread pattern consisting of plural grooves formed on the contact surface thereof with a road as in the case of conventional pneumatic tires made of rubber.

A manufacturing method of the tire of the embodiment will now be described.

(Tire Case Molding Process)

First, as described above, tire case half bodies are formed by using a resin material including a resin composition that includes the polyamide-based thermoplastic resin elastomer. Formation of these tire cases is preferably performed by injection molding. Next, the tire case half bodies are supported by a thin metal support ring and disposed in such a manner as to face each other. Then, an unillustrated joining mold is disposed so as to contact with an outer circumferential surface of a portion at which the tire case half bodies are abutted to each other. The joining metal mold is adapted so as to push under a predetermined pressure the periphery of the part to be bonded of the tire case half bodies 17A (abutting part). Then, the periphery of the part to be bonded of the tire case half bodies is pushed at a temperature higher or equal to the melting point (or softening point) of the resin material of which the tire case is made. When the part to be bonded of the tire case half bodies is pressurized or heated by the joining metal mold, the part to be bonded becomes molten, and the tire case half bodies are fused with each other to integrally form the tire case 17. Although the joining metal mold was used to heat the part to be bonded of the tire case half bodies in the embodiment, the invention is not limited to this embodiment, for example, the part to be bonded may be heated by an independently installed radio-frequency heating machine, or the part to be bonded may be softened or melted by hot air or infrared light irradiation, and may be pressurized by the joining metal mold to bond the tire case half bodies.

(Step of Winding Reinforcing Cord Member)

The cord-reinforced layer 28 can be formed on the outer peripheral side of the crown part 16 of the tire case 17 by embedding while winding the heated reinforcing cord 26 around the outer peripheral surface of the crown part 16, using a reel with the reinforcing cord 26 wound therearound, a cord heating device and a cord supply device equipped with various rollers. A figure which illustrates this formation is omitted.

Thus, the cord-reinforced layer 28 is formed on the outer peripheral side of the crown part 16 of the tire case 17 by embedding while winding the heated reinforcing cord 26 around the outer peripheral surface of the crown part 16.

Then, the vulcanized belt-like tread 30 is wound by one round around the outer peripheral surface of the tire case 17 and the tread 30 is adhered to the outer peripheral surface of tire case 17 by adhesive. Precured treads used for recycled tires known conventionally can be used as the tread 30. This step is the same step as that of adhering a precured tread to the outer peripheral surface of the base tire of a recycled tire.

Finally, the tire 10 is completed after adhering the seal layer 24 made of vulcanized rubber to the bead part 12 of the tire case 17 by, for example, adhesive.

(Effects)

In the tire 10 of the present embodiment, the tire case 17 is formed by using a resin material including a polyamide-based thermoplastic elastomer that includes a hard segment, a soft segment consisting of a constituent unit derived from polypropylene glycol, and a binding portion that binds two or more segments and that consists of a constituent unit derived from a dicarboxylic acid of from 6 to 20 carbons, and that has a weight average molecular weight of from 20,000 to 250,000. Accordingly, the tire 10 of the embodiment is well-balanced and excellent in manufacturing efficiency, low-loss property, heat resistance, and rim fittability.

In the tire 10 of the embodiment, blow-out resistance, cut resistance, and stiffness in the circumferential direction of the tire 10 are improved because the reinforcing cord 26 having higher stiffness than the resin material is helically wound in the circumferential direction around the outer peripheral surface of the crown part 16 of the tire case 17 made of the resin material. The improvement in the stiffness in the circumferential direction of tire 10 prevents the creeping of the tire case 17 made of the resin material.

In the cross-sectional view along the axial direction of the tire case 17 (the cross-section depicted in the FIG. 1A), since at least a part of the reinforcing cord 26 is embedded into the outer peripheral surface of the crown part 16 of the tire case 17 made of the resin material and is attached to the resin material, the air-penetration during manufacturing is suppressed, and the displacement of the reinforcing cord 26, for example, due to applied force during driving is suppressed. As a result, for example, abrasion of the reinforcing cord 26, the tire case 17, and the tread 30 is suppressed, resulting in the improvement of the durability of the tire 10.

As can be seen in the FIG. 2, the embedded amount L of the reinforcing cord 26 is $\frac{1}{5}$ or more of the diameter D, thereby effectively suppressing the air-penetration during manufacturing, and the displacement of the reinforcing cord 26, for example, due to applied force during driving is further suppressed.

Moreover, since the annular bead core 18 made of metal material is embedded in the bead part 12, the tire case 17, or the tire 10 is robustly supported on the rim 20 as in the case of conventional pneumatic tires made of rubber.

Furthermore, since the seal layer 24 made of a rubber material having a better sealing property than that of the resin material of which the tire case 17 is made is placed on a part in contact to the rim 20 of the bead part 12, air-sealing property between the tire 10 and the rim 20 is improved. Consequently, the air leaking within the tire is further suppressed compared to when the tire is sealed only with the resin material that forms the rim 20 and the tire case 17. In addition, the installation of the seal layer 24 also improves the rim-fitting.

Still further, although the first embodiment is configured such that the reinforcing cord 26 is heated, the outer perimeter of the reinforcing cord 26 may be covered, for example, by the same resin material as the tire case 17, and in this case, the covering resin material as well as the reinforcing cord 26 are heated when the covered reinforcing cord is wound around the crown part 16 of the tire case 17, whereby air-penetration during the embedment into the crown part 16 can be effectively suppressed.

The reinforcing cord 26 can be easily wound helically in manufacturing, but another method is possible such as a method in which the reinforcing cord 26 is discontinuous in the width direction of the tire.

Although the tire 10 of the first embodiment is the so-called tubeless tire which forms an air room between the tire 10 and the rim 20 by attaching the bead part 12 to the rim 20, the invention is not limited to this configuration, and may have a complete tube shape.

Although modes for carrying out the invention have been described by exemplifying the embodiments, these embodiments are only examples and various modifications can be done within the scope of the subject matter of the invention. It is obvious that the scope of right of the invention is not limited to these embodiments.

EXAMPLES

The invention will now be described more specifically by using Examples. However, the invention is not limited these Examples.

Example 1

In a two-litter reaction vessel equipped with a stirrer, an inlet for nitrogen gas, and an outlet for condensed water, 36.4 g of 1,2-aminododecanoic acid (manufactured by Aldrich Chemical Co. Ltd.), 500 g of aminododecanolactam, and 17.7 g of dodecanedioic acid (a chain extender to form a binding portion) were placed, and the inside of the vessel was thoroughly substituted with nitrogen gas. After that, the temperature inside was increased up to 280° C., and the mixture was allowed to react for 4 hours under a pressure of 0.4 MPa. After releasing the pressure, the reaction mixture was allowed to additionally react for one more hour in a nitrogen gas flow to obtain a white solid that was a nylon 12 polymer having a molecular weight of 3700 (polymerization reaction A).

The obtained nylon 12 polymer is a polymer in which the dodecanedioic acid as the chain extender is bound to a terminal of a polyamide (nylon 12) having a molecular weight of 3200 as a hard segment.

To 200 g of the obtained nylon 12 polymer, 143.7 g of polyoxypropylene diamine (ELASTAMINE RP-2009 manufactured by Huntsman Corporation, number average molecular weight: 2000,) was added as a soft segment, and the mixture was stirred at 250° C. for 4 hours (polymerization reaction B). Furthermore, 1 g of IRGANOX 1010 was added to obtain a white polyamide-based thermoplastic elastomer.

Example 2

A polyamide-based thermoplastic elastomer was obtained in the similar way as in Example 1 except that, in the polymerization reaction B, the amount of polyoxypropylene diamine added was 131.3 g, and the reaction temperature and the reaction time were 230° C. and to 4 hours, respectively.

Example 3

A polyamide-based thermoplastic elastomer was obtained in the similar way as in Example 1 except that the amount of polyoxypropylene diamine added was 175 g, and the reaction temperature and the reaction time in the polymerization reaction B were 230° C. and 5 hours, respectively.

Example 4

A polyamide-based thermoplastic elastomer was obtained in the similar way as in Example 1 except that the amount of polyoxypropylene diamine added was 127.3 g, and the reaction temperature and the reaction time in the polymerization reaction B were 230° C. and 5 hours, respectively.

Example 5

A polyamide-based thermoplastic elastomer was obtained in the similar way as in Example 1 except that the amount of polyoxypropylene diamine added was 107.7 g, and the reaction temperature and the reaction time in the polymerization reaction B were 230° C. and 5 hours, respectively.

Example 6

A polyamide-based thermoplastic elastomer was obtained in the similar way as in Example 1 except that the amount of polyoxypropylene diamine added was 82.4 g, and the reaction temperature and the reaction time in the polymerization reaction B were 230° C. and 5 hours, respectively.

Example 7

A polyamide-based thermoplastic elastomer was obtained in the similar way as in Example 1 except that the kind and amount of the chain extender used was 14.0 g of adipic acid, the reaction temperature and the reaction time in the polymerization reaction A were 280° C. and 4 hours, respectively, and the reaction temperature and the reaction time in the polymerization reaction B were 230° C. and 6.5 hours, respectively.

Example 8

A polyamide-based thermoplastic elastomer was obtained in the similar way as in Example 1 except that the kind and amount of the chain extender used was 29.0 g of eicosanedioic acid, the reaction temperature and the reaction time in the polymerization reaction A were 280° C. and 4 hours, respectively, and the reaction temperature and the reaction time in the polymerization reaction B were 230° C. and 5.5 hours, respectively.

Example 9

A polyamide-based thermoplastic elastomer was obtained in the similar way as in Example 1 except that the amount of polyoxypropylene diamine added was 107.7 g, and the reaction temperature and the reaction time in the polymerization reaction B were 230° C. and 6 hours, respectively.

Example 10

A polyamide-based thermoplastic elastomer was obtained in the similar way as in Example 1 except that the amount of polyoxypropylene diamine added was 107.7 g, and the reaction temperature and the reaction time in the polymerization reaction B were 230° C. and 7 hours, respectively.

Example 11

A polyamide-based thermoplastic elastomer was obtained in the similar way as in Example 1 except that the amount of polyoxypropylene diamine added was 107.7 g, and the reaction temperature and the reaction time in the polymerization reaction B were 230° C. and 8.5 hours, respectively.

Example 12

A polyamide-based thermoplastic elastomer was obtained in the similar way as in Example 1 except that the amount of polyoxypropylene diamine added was 127.3 g, and the reaction temperature and the reaction time in the polymerization reaction B were 230° C. and 6 hours, respectively.

Example 13

A polyamide-based thermoplastic elastomer was obtained in the similar way as in Example 1 except that the amount of polyoxypropylene diamine added was 93.3 g, and the reaction temperature and the reaction time in the polymerization reaction B were 230° C. and 6 hours, respectively.

Example 14

A polyamide-based thermoplastic elastomer was obtained in the similar way as in Example 1 except that instead of polyoxypropylene diamine, 131.3 g of polypropylene glycol (manufactured by Wako Pure Chemical Industries Ltd., part number: 164-05895, number average molecular weight: 2000) was used, 0.04 g of zirconium tetrabutoxide (manufactured by Tokyo Chemical Industry Co., Ltd., part number: Z0016) was used as a polymerization solvent, and the reaction temperature and the reaction time in the polymerization reaction B were 260° C. and 6 hours, respectively.

Example 15

In a two-litter reaction vessel equipped with a stirrer, an inlet for nitrogen gas, and an outlet for condensed water, 500 g of caprolactam manufactured by Aldrich, 124 g of dodecanedioic acid, and 77 g of aminohexanoic acid were placed, and the inside of the vessel was thoroughly substituted with nitrogen gas. The temperature inside was increased up to 250° C., and the mixture was allowed to react for 4 hours under a pressure of 0.6 MPa. After releasing the pressure, the mixture was allowed to additionally react for 1 more hour in a nitrogen gas flow, and then passed through a water washing process to obtain a white solid that was a nylon 6 (polyamide 6) polymer having a number average molecular weight of 3000.

To 200 g of the obtained nylon 6 (polyamide 6) polymer, 133.3 g of polyoxypropylene diamine (ELASTAMINE RP-2009 manufactured by Huntsman Corporation, number average molecular weight: 2000) was added as a soft segment, and the obtained mixture was stirred at 230° C. for 5 hours. Furthermore, 1 g of IRGANOX 1010 was added to obtain a white polyamide-based thermoplastic elastomer.

Example 16

In a two-litter reaction vessel equipped with a stirrer, an inlet for nitrogen gas, and an outlet for condensed water, 207 g of dodecanedioic acid, 93 g of hexamethylenediamine, and 100 g of purified water were placed, and the inside of the vessel was thoroughly substituted with nitrogen gas. Then, the temperature inside was increased up to 280° C., and the mixture was allowed to react for 4 hours under a pressure of 0.6 MPa. After releasing the pressure, the mixture was allowed to additionally react for 1 more hour in a nitrogen gas flow, and was taken out of the vessel. The reaction mixture was subjected to Soxhlet extraction with ethanol for 24 hours to obtain a white solid that was a nylon 612 (polyamide 612) polymer having a number average molecular weight of 3000.

To 200 g of the obtained nylon 612 (polyamide 612) polymer, 133.3 g of polyoxypropylene diamine (ELASTAMINE RP-2009 manufactured by Huntsman Corporation, number average molecular weight: 2000) was added as a soft segment, and the obtained mixture was stirred at 230° C. for 5 hours. Furthermore, 1 g of IRGANOX 1010 was added to obtain a white polyamide-based thermoplastic elastomer.

Comparative Example 1

A polyamide-based thermoplastic elastomer was obtained in the similar way as in Example 1 except that instead of polyoxypropylene diamine, 113.8 g of ABA type triblock polyether diamine (PPG-PTMG-PPG triblock polymer manufactured by Huntsman Corporation, part number: XTJ-542, number average molecular weight: 1000) was used, and the reaction temperature and reaction time in the polymerization reaction B were 230° C. and 6 hours, respectively.

"PPG" refers to a constituent unit derived from polypropylene glycol, and "PTMG" refers to a constituent unit derived from polytetraethylene ether glycol.

Comparative Example 2

A polyamide-based thermoplastic elastomer was obtained in the similar way as in Example 1 except that the kind and amount of the chain extender used was 45.2 g of hydrogenated dimer acid (PRIPOL 1009 manufactured by Uniqema Corporation) and, the reaction temperature and the reaction time in the polymerization reaction A were 280° C. and 4 hours, respectively, and the reaction temperature and the reaction time in the polymerization reaction B were 230° C. and 8 hours, respectively.

Comparative Example 3

A polyamide-based thermoplastic elastomer was obtained in the similar way as in Example 1 except that the amount of polyoxypropylene diamine added was 269.2 g, and the reaction temperature and the reaction time in the polymerization reaction B were 250° C. and 1 hour, respectively.

Comparative Example 4

A polyamide-based thermoplastic elastomer was obtained in the similar way as in Example 1 except that the amount of polyoxypropylene diamine added was 233.3 g, and the reaction temperature and the reaction time in the polymerization reaction B were 250° C. and 1 hour, respectively.

Comparative Example 5

A polyamide-based thermoplastic elastomer was obtained in the similar way as in Example 1 except that the amount of polyoxypropylene diamine added was 107.7 g, and the reaction temperature and the reaction time in the polymerization reaction B were 230° C. and 9 hours, respectively.

Comparative Example 6

A polyamide-based thermoplastic elastomer was obtained in the similar way as in Example 1 except that the kind and amount of the chain extender used was 29.2 g of docosanedioic acid, the reaction temperature and the reaction time in the polymerization reaction A were 280° C. and 4 hours, respectively, and the reaction temperature and the reaction time in the polymerization reaction B were 230° C. and 6 hours, respectively.

[Evaluation]

Thermoplastic elastomers obtained from Examples and Comparative Examples were evaluated for the following items. Specifically, the obtained polyamide-based thermoplastic elastomers were pelletized and injection molded at from 200° C. to 240° C. to obtain sample pieces. A variety of measurements were performed by using samples punched out from these sample pieces as test pieces. The results are shown in Tables 1 to 4.

(Low Loss Property)

A viscoelasticity measurement device (Rheometric Scientific Inc) was performed on samples having a diameter of 8 mm and a thickness of 2 mm to measure loss tangent (tan δ) at the temperature of 30° C., under the strain of 1% and in the frequency of 20 Hz, and evaluation was made according to the following criteria. As the tan δ is smaller, the low-loss property is better.

A: Tan δ is equal to or less than 0.08.
B: Tan δ is more than 0.08 but equal to or less than 0.12.
C: Tan δ is more than 0.12.

With respect to each measured value of low-loss property obtained by the above measurement method, calculation was performed according to the following Formula so that a measured value of Example 3 (tan $δ_3$), that was a lowest-loss material, was 100 to obtain a converted value. Tables 1 to 4 also show the converted values. Larger converted value indicates superior low-loss property.

Formula: Converted value=(tan $δ_3$/tan δ)×100

(Heat Resistance)

A differential scanning calorimeter (DSC) [TA Instruments Japan Inc., DSC Q2000] was used to heat the thermoplastic elastomers obtained from each Example and Comparative Example from 0° C. to 200° C. with an increase of 10° C./min. Evaluation criteria are as follows:

A: Fusion start temperature is equal to or more than 155° C.
B: Fusion start temperature is from 130° C. to less than 155° C.
C: Fusion start temperature is less than 130° C.

(Injection Moldability)

Using "SE30D" manufactured by Sumitomo Heavy Industries, Ltd., as an injection molding machine, injection molding was performed under conditions: molding temperature of from 200° C. to 235° C., mold temperature of from 50° C. to 70° C., and load of 15 t to measure a time from injection starting to injection termination (a measured time). From the obtained results, evaluation was performed according to the following criteria:

A: Under the load of 15 t, molding of a flat plate is possible, and handleability is favorable (the measured time is less than 30 seconds).

B: Under the load of 15 t, molding of a flat plate is possible, but handleability is inferior (the measured time is equal to or more than 30 seconds).

C: Under the load of 15 t, a filling failure is found.

(Rim Fittability)

The thermoplastic elastomers obtained from each Example and Comparative Example were used to form a tire by reference to the first embodiment. Next, each of the tires was fitted to a rim, and evaluation was performed according to the following criteria:

A: Air sealing performance was ensured, and handleability was favorable.
B: Air sealing performance was ensured, but handleability was inferior due to hardness in fitting to a rim.
C: Air sealing performance was not ensured.

(Reactivity)

Reactivity was evaluated from the rate of change in torque with respect to polymerization time in the polymerization reaction B in the process of obtaining the thermoplastic elastomer in each of Examples and Comparative Examples. Specifically, the time it took for the torque of a stirring motor to reach 0.07 N·m was measured, and reactivity was evaluated based on the following criteria:

A: reaches within 1.5 hours.
B: reaches within 2.0 hours.
C: takes 3.0 hours or more.

(Overall Evaluation)

Regarding the thermoplastic elastomers obtained by respective Examples and Comparative Examples, the above evaluation (low-loss property, heat resistance, injection moldability, rim fittability, and reactivity) was performed. Evaluation on each item was made by a full 10-point system: +2 points for A, +1 points for B, and 0 points for C. When the overall evaluation is 7 points or more, a tire well-balanced and excellent in manufacturing efficiency, low-loss property, heat resistance, and rim fittability can be obtained.

(Weight Average Molecular Weight and Molecular Weight Distribution)

Regarding the thermoplastic elastomers obtained in respective Examples and Comparative Examples, measurement was performed by gel permeation chromatography (GPC) using "HLC-8320GPC EcoSEC" manufactured by Tosoh Corporation. The results are shown in Tables 1 to 4.

TABLE 1

|  |  | Example 1 | Example 2 | Example 3 | Example 4 | Example 5 | Example 6 | Example 7 |
|---|---|---|---|---|---|---|---|---|
|  | HS | PA12 | PA12 | PA12 | PA12 | PA12 | PA12 | PA12 |
|  | SS | PPG | PPG | PPG | PPG | PPG | PPG | PPG |
|  | Binding portion | Dodecanedioic acid | Dodecanedioic acid | Dodecanedioic acid | Dodecanedioic acid | Dodecanedioic acid | Dodecanedioic acid | Adipic acid |
|  | HS/SS ratio (x/y) | 65/35 | 65/35 | 40/60 | 55/45 | 65/35 | 85/15 | 65/35 |
|  | Bond type | Amide | Amide | Amide | Amide | Amide | Amide | Amide |
| Molecular weight | Weight average molecular weight | 20,000 | 60,000 | 100,000 | 100,000 | 100,000 | 100,000 | 100,000 |
|  | Molecular weight distribution | 4.8 | 2.3 | 1.9 | 1.5 | 1.7 | 1.5 | 1.6 |
| Evaluation | Low loss property (Converted value) | (80) B | (86) A | (100) A | (98) A | (88) A | (75) B | (86) A |
|  | Heat resistance (Fusion start temperature [° C.]) | (160) A | (159) A | (130) B | (138) B | (159) A | (165) A | (158) A |
|  | Injection moldability | B | A | A | A | A | A | A |
|  | Rim fittability | B | B | A | A | A | A | A |
|  | Reactivity | A | A | A | A | A | A | C |
| Overall evaluation |  | 7 | 9 | 9 | 9 | 10 | 9 | 8 |

TABLE 2

|  |  | Example 8 | Example 9 | Example 10 | Example 11 | Example 12 | Example 13 | Example 14 |
|---|---|---|---|---|---|---|---|---|
|  | HS | PA12 | PA12 | PA12 | PA12 | PA12 | PA12 | PA12 |
|  | SS | PPG | PPG | PPG | PPG | PPG | PPG | PPG |
|  | Binding portion | Eicosanedioic acid | Dodecanedioic acid | Dodecanedioic acid | Dodecanedioic acid | Dodecanedioic acid | Dodecanedioic acid | Dodecanedioic acid |
|  | HS/SS ratio (x/y) | 65/35 | 65/35 | 65/35 | 65/35 | 55/45 | 75/25 | 65/35 |
|  | Bond type | Amide | Amide | Amide | Amide | Amide | Amide | Ester |
| Molecular weight | Weight average molecular weight | 100,000 | 150,000 | 200,000 | 250,000 | 150,000 | 100,000 | 60,000 |
|  | Molecular weight distribution | 1.5 | 1.6 | 1.8 | 1.8 | 2.1 | 1.9 | 1.9 |
| Evaluation | Low loss property (Converted value) | (89)A | (87) A | (87) A | (88) A | (96) A | (83) A | (89) A |
|  | Heat resistance (Fusion start temperature [° C.]) | (155) A | (156) A | (154) B | (151) B | (135) B | (160) A | (152) A |
|  | Injection moldability | A | A | B | B | A | A | A |
|  | Rim fittability | A | A | A | A | A | A | A |
|  | Reactivity | A | A | A | A | A | A | A |
|  | Overall evaluation | 10 | 10 | 8 | 8 | 9 | 10 | 10 |

TABLE 3

|  |  | Example 15 | Example 16 |
|---|---|---|---|
|  | HS | PA6 | PA612 |
|  | SS | PPG | PPG |
|  | Binding portion | Dodecanedioic acid | Dodecanedioic acid |
|  | HS/SS ratio (x/y) | 60/40 | 60/40 |
|  | Bond type | Amide | Amide |
| Molecular weight | Weight average molecular weight | 170,000 | 180,000 |
|  | Molecular weight distribution | 1.7 | 1.9 |
| Evaluation | Low loss property (Converted value) | (89) A | (91) A |
|  | Heat resistance (Fusion start temperature [° C.]) | (171) A | (180) A |
|  | Injection moldability | A | A |
|  | Rim fittability | A | A |
|  | Reactivity | A | A |
|  | Overall evaluation | 10 | 10 |

In Tables 1 to 4, "HS" represents a hard segment, and "SS" represents a soft segment.

In addition, in Tables 1 to 4, "PA 12" represents being derived from nylon 12 (polyamide 12), "PA 6" represents being derived from nylon 6 (polyamide 6), and "PA 612" represents being derived from nylon 612 (polyamide 612). Additionally, "PPG" represents being derived from polypropylene glycol. Moreover, "PPG-PTMG-PPG" means a ternary copolymer having a constituent unit from PTMG and a constituent unit from PPG As can be seen from Tables 1 to 4, the Examples are higher in the overall evaluation as compared to Comparative Example 1 in which the soft segment is a triblock copolymer including PTMG, Comparative Examples 2 and 6 in which the number of carbon atoms of the dicarboxylic acid included in the binding portion is outside the above range, and Comparative Examples 3 to 5 in which the weight average molecular weight of the polyamide-based thermoplastic elastomer is outside the above range. Thus, it has been shown that the tires of the Examples are well-balanced

TABLE 4

|  |  | Comparative Example 1 | Comparative Example 2 | Comparative Example 3 | Comparative Example 4 | Comparative Example 5 | Comparative Example 6 |
|---|---|---|---|---|---|---|---|
|  | HS | PA12 | PA12 | PA12 | PA12 | PA12 | PA12 |
|  | SS | PPG-PTMG-PPG | PPG | PPG | PPG | PPG | PPG |
|  | Binding portion | Adipic acid | Dimer acid | Dodecanedioic acid | Dodecanedioic acid | Dodecanedioic acid | Docosanedioic acid |
|  | HS/SS ratio (x/y) | 75/25 | 65/35 | 65/35 | 75/25 | 65/35 | 65/35 |
|  | Bond type | Amide | Amide | Amide | Amide | Amide | Amide |
| Molecular weight | Weight average molecular weight | 100,000 | 120,000 | 10,000 | 10,000 | 280,000 | 100,000 |
|  | Molecular weight distribution | 1.98 | 1.7 | 5.7 | 4.9 | 2.2 | 1.7 |
| Evaluation | Low loss property (Converted value) | (79) B | (90) A | (61) C | (55) C | (88) A | (89) A |
|  | Heat resistance (Fusion start temperature [° C.]) | (144) B | (151) B | (161) A | (162) A | (151) B | (152) B |
|  | Injection moldability | A | A | C | C | C | A |
|  | Rim fittability | A | C | C | C | C | B |
|  | Reactivity | C | C | A | A | A | C |
|  | Overall evaluation | 6 | 5 | 4 | 4 | 5 | 6 | and excellent in manufacturing efficiencies (i.e., injection moldability and reactivity), low-loss property, heat resistance, and rim fittability.

JP-A No. 2014-193427 filed on Sep. 24, 2014 is incorporated in its entirety herein by reference.

All documents, patent applications, and technical standards described herein are incorporated herein by reference to the same extent as if the documents, patent applications, and technical standards are described individually and specifically.

The invention claimed is:

1. A tire comprising a tire skeleton body that is made of a resin material containing a polyamide-based thermoplastic elastomer and has a ring shape, wherein
the polyamide-based thermoplastic elastomer includes a hard segment, a soft segment consisting of a constituent unit derived from polypropylene glycol, and a binding portion that binds two or more segments and that consists of a constituent unit derived from a dicarboxylic acid of from 6 to 20 carbons, the polyamide-based thermoplastic elastomer having a weight average molecular weight of from 20,000 to 250,000;
the tire skeleton body comprises (a) first and second bead parts, (b) first and second side parts, the first side part extending from the first bead part in the outward radial direction of the tire, and the second side part extending from the second bead part in the outward radial direction of the tire, and (c) an outer peripheral crown part connecting a first outward end of the first side part in the radial direction of the tire with a second outward end of the second side part in the radial direction of the tire, and
an annular bead core is embedded in each of the first and second bead parts.

2. The tire according to claim 1, wherein the polyamide-based thermoplastic elastomer has a weight average molecular weight of from 60,000 to 200,000.

3. The tire according to claim 1, wherein the polyamide-based thermoplastic elastomer has a weight average molecular weight of from 80,000 to 160,000.

4. The tire according to claim 1, wherein the dicarboxylic acid of from 6 to 20 carbons is at least one selected from the group consisting of dodecanedioic acid, adipic acid and eicosanedioic acid.

5. The tire according to claim 1, wherein, in the polyamide-based thermoplastic elastomer, a ratio (x/y) of a mass of the hard segment (x) to a mass of the soft segment (y) is from 54/46 to 90/10.

6. The tire according to claim 1, wherein, in the polyamide-based thermoplastic elastomer, a ratio (x/y) of a mass of the hard segment (x) to a mass of the soft segment (y) is from 54/46 to 88/12.

7. The tire according to claim 1, wherein the hard segment comprises a constituent unit derived from at least one selected from the group consisting of polyamide 6, polyamide 11, polyamide 12, polyamide 66 and polyamide 612.

* * * * *